US012580322B2

(12) United States Patent
Taravati et al.

(10) Patent No.: US 12,580,322 B2
(45) Date of Patent: Mar. 17, 2026

(54) REFLECTIVE BEAM-STEERING METASURFACE

(71) Applicant: LATYS Intelligence Inc., Montreal (CA)

(72) Inventors: Sajjad Taravati, Toronto (CA); George Eleftheriades, Scarborough (CA)

(73) Assignee: LATYS Intelligence Inc., Montreal (CA)

( * ) Notice: Subject to any disclaimer, the term of this patent is extended or adjusted under 35 U.S.C. 154(b) by 37 days.

(21) Appl. No.: 18/260,958

(22) PCT Filed: Jan. 12, 2022

(86) PCT No.: PCT/CA2022/050045
§ 371 (c)(1),
(2) Date: Jul. 11, 2023

(87) PCT Pub. No.: WO2022/150916
PCT Pub. Date: Jul. 21, 2022

(65) Prior Publication Data
US 2024/0072452 A1 Feb. 29, 2024

Related U.S. Application Data

(60) Provisional application No. 63/137,260, filed on Jan. 14, 2021.

(51) Int. Cl.
*H01Q 21/06* (2006.01)
*H01Q 3/46* (2006.01)
(Continued)

(52) U.S. Cl.
CPC ........... *H01Q 15/0086* (2013.01); *H01Q 3/46* (2013.01); *H01Q 15/148* (2013.01)

(58) Field of Classification Search
CPC .... H01Q 15/0086; H01Q 15/148; H01Q 3/46; H01Q 3/44; H01Q 21/065; G02B 1/002; G02B 26/0816
See application file for complete search history.

(56) References Cited

U.S. PATENT DOCUMENTS 8,040,586 B2 * 10/2011 Smith ................ H01Q 15/0086 359/278
10,461,433 B2 * 10/2019 Smith ...................... H01Q 3/44
(Continued)

FOREIGN PATENT DOCUMENTS

| | | |
|---|---|---|
| CA | 2734962 | 2/2010 |
| EP | 1771756 | 4/2007 |
| WO | 2018052994 | 3/2018 |

OTHER PUBLICATIONS

Extended European Search Report issued in App. No. EP22738868, dated Nov. 15, 2024, 9 pages.
(Continued)

*Primary Examiner* — Awat M Salih
(74) *Attorney, Agent, or Firm* — Blueshift IP; Robert Plotkin

(57) ABSTRACT

Embodiments of the invention may present a full-duplex nonreciprocal-beam-steering transmissive phase-gradient meta-surface. The metasurface may comprise a conductor layer interposed between two dielectric layers. Each of the dielectric layers may comprise a plurality of unit-cells embedded therein. Each of the unit-cell may comprise phase shifters and antenna elements. The meta-surface may function such that when an electromagnetic wave is received at the surface of the metasurface, the metasurface may transmit a wave having a similar or identical frequency to the frequency of the received wave but to a different direction in space.

16 Claims, 15 Drawing Sheets

(51) Int. Cl.
*H01Q 15/00* (2006.01)
*H01Q 15/14* (2006.01)

(56) References Cited

U.S. PATENT DOCUMENTS

| | | | | |
|---|---|---|---|---|
| 10,490,903 | B2 * | 11/2019 | Foo | H01Q 21/065 |
| 10,673,130 | B2 | 6/2020 | De Rochemont | |
| 10,700,429 | B2 * | 6/2020 | Mehdipour | H01Q 5/335 |
| 10,775,648 | B2 | 9/2020 | Atwater | |
| 10,931,004 | B2 * | 2/2021 | Yoo | H04B 7/0413 |
| 11,476,555 | B1 * | 10/2022 | Roper | G02F 1/19 |
| 11,710,898 | B1 * | 7/2023 | Quarfoth | H03G 3/3036<br>342/372 |
| 2004/0066251 | A1 | 4/2004 | Eleftheriades | |
| 2008/0048916 | A1 * | 2/2008 | Brown | H01Q 15/002<br>343/700 MS |
| 2018/0180771 | A1 * | 6/2018 | Seo | G02B 27/28 |
| 2019/0103663 | A1 * | 4/2019 | Ichinose | H01Q 21/0037 |
| 2020/0227632 | A1 * | 7/2020 | Kim | G02B 26/06 |
| 2020/0243968 | A1 * | 7/2020 | Behdad | H01Q 15/22 |
| 2020/0309900 | A1 * | 10/2020 | Brune | H01Q 1/3233 |
| 2022/0102863 | A1 * | 3/2022 | Shekhar | H01Q 9/0485 |

OTHER PUBLICATIONS

Sajjad Taravati et al., Full-Duplex Nonreciprocal-Beam-Steering Metasurfaces Comprising Time-Modulated Twin Meta-Atoms, Nov. 11, 2019.

Japanese Office Action (with English translation) issued in App. No. JP2023542747, dated Jul. 29, 2025, 18 pages.

* cited by examiner

REFLECTIVE BEAM-STEERING METASURFACE

TECHNICAL FIELD

The following relates to the field of metasurfaces for nonreciprocal wave engineering and electromagnetic wave radiation control. Specifically, a method for versatile controlling of electromagnetic waves for full-duplex and nonreciprocal beam-steering by a reflective surface is presented.

BACKGROUND

Modern wireless telecommunication systems may require versatile apparatuses which are capable of nonreciprocal wave processing, especially in the reflective state.

Nonreciprocal radiation refers to electromagnetic wave radiation in which the structure provides different response under the change of the direction of the incident field. Ferrite-based magnetic materials have been used for nonreciprocity implementation. However, the ferrite-based magnetic materials may be heavy, costly, may not be compatible with printed circuit board technology, and may not be suitable for high frequency applications, which may include 5G, 6G and future generations of telecommunication systems.

Improved telecommunications systems are needed.

SUMMARY

In one embodiment, a reflective metasurface is provided. The metasurface comprises a dielectric layer sandwiched between two conductor layers. The bottom conductor layer may act as the ground plane of the patch antenna elements, and also may include the direct current (DC) signal patch of the unilateral circuits. The top conductor layer may include patch antenna elements, transistors, and phase shifters. The dielectric layer may separate the two conductor layers from each other.

Each unit-cell may be formed by a patch antenna element, a phase shifter and a unilateral circuit.

When an electromagnetic wave is received at the surface of the metasurface, the metasurface reflects a wave having an identical frequency to the frequency of the received wave but towards a desired direction in space.

In another embodiment, a metasurface system is provided. The metasurface system comprises a dielectric layer interposed between two conductor layers. Each of the conductor layers comprises a plurality of unit-cells embedded therein. Each unit-cell in the plurality of unit-cells comprises a surrounding circuit. The surrounding circuit may be composed of at least one microstrip patch radiator in electrical connection with one phase shifter in electrical connection with a unilateral circuit, e.g., a transistor. The transistor radio frequency (RF) circuit includes two decoupling capacitors, and the DC biasing circuit of the transistor includes an inductor, two capacitors and one resistor.

In yet another embodiment, a method of beam steering using a reflective metasurface is provided. The method comprises biasing a unit-cell with a DC signal; the DC signal undergoing at least one set of gradient phase shifts; the DC signal then biasing at least one transistor to create a nonreciprocal phase shift.

BRIEF DESCRIPTION OF THE DRAWINGS

Embodiments will now be described with reference to the appended drawings wherein.

DETAILED DESCRIPTION

Embodiments of the invention may present a nonreciprocal-beam-steering phase-gradient reflective metasurface that may assist in an efficient full-duplex communication. The metasurface may be placed on a wall or in front of an antenna to amplify a wave, and/or steer a beam to a desired direction, i.e., transform the radiation pattern and introduce different radiation patterns for the wave incidences from its left and right sides. The metasurface is endowed with directive, diverse and asymmetric transmission and reception radiation beams, and tunable beam shapes. Furthermore, these beams can be steered by changing the DC bias of nonreciprocal phase shifters. There is no undesired harmonics, yielding a high conversion efficiency with significant wave amplification which is of paramount importance for practical applications such as point to point full-duplex communications.

Figure 1:
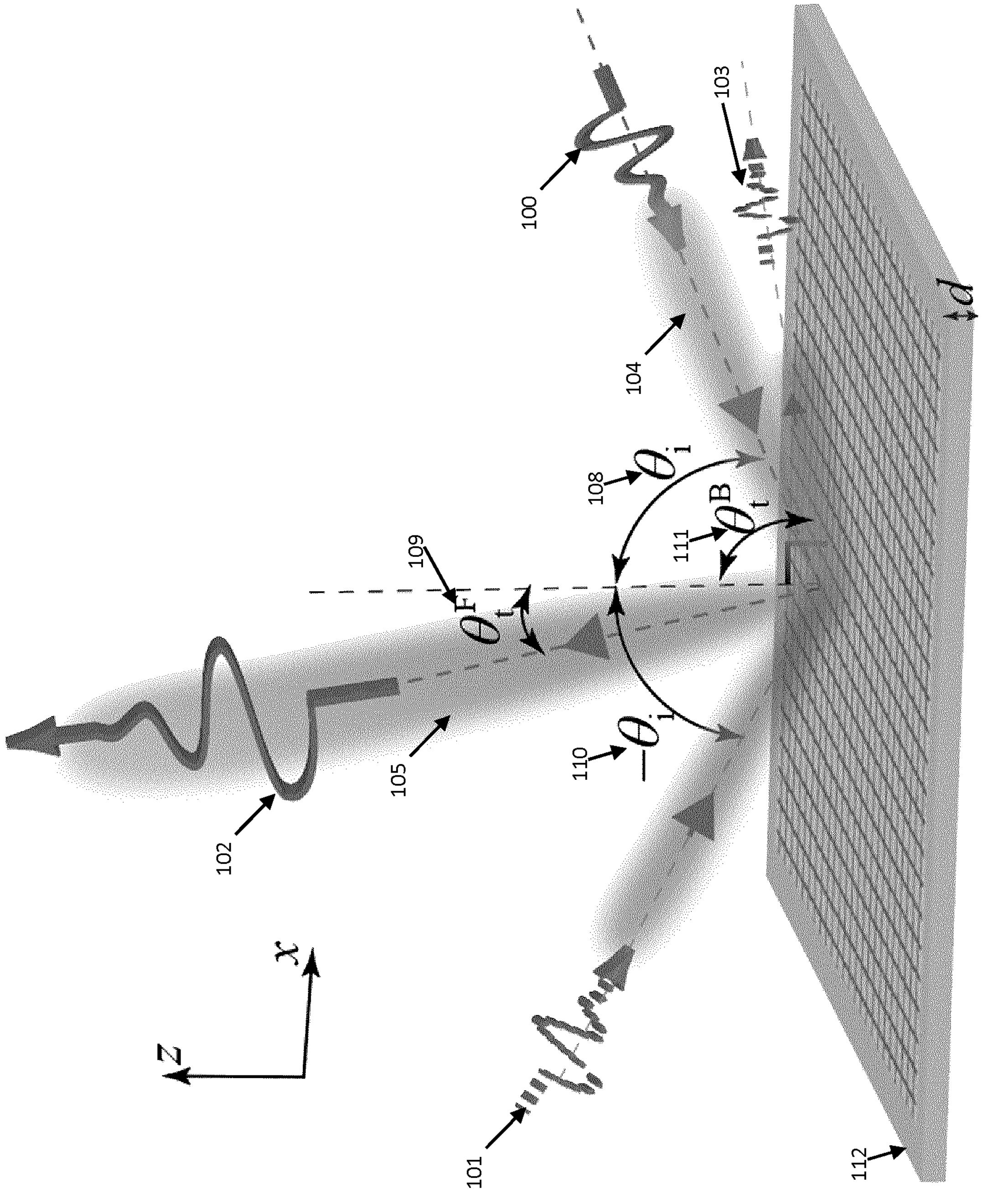
FIG. 1 provides a schematic representation of a metasurface system and nonreciprocal beam-steering operation.

Turning now to the figures, FIG. 1 depicts the structure of the reflective metasurface 112 and the operation principle of nonreciprocal-beam functionality of the metasurface. The metasurface thickness is subwavelength. In the forward problem, denoted by "F", the incident wave 100 from the top-right side 104 under the angle of incidence 108 impinges the top of the metasurface 112, is being amplified and reflected to the top-left side of the metasurface 102 at a desired angle of transmission 109. The amplification 105 and angle of transmission of the transmitted wave 109 can be tuned through the DC bias supplying the nonreciprocal phase shifters.

In the backward problem, denoted by "B", the incident wave from the top-left side 101 under the angle of incidence 110 impinges the top of the metasurface 112, and is reflected to the top-right side 107 of the metasurface 103 at a desired angle of transmission 111, which is different than the angle of transmission of the forward problem 109. The amplification levels and the angles of transmission of the forward and backward problem are completely different and can be tuned through the DC bias supplying the nonreciprocal phase shifters.

Figure 2:
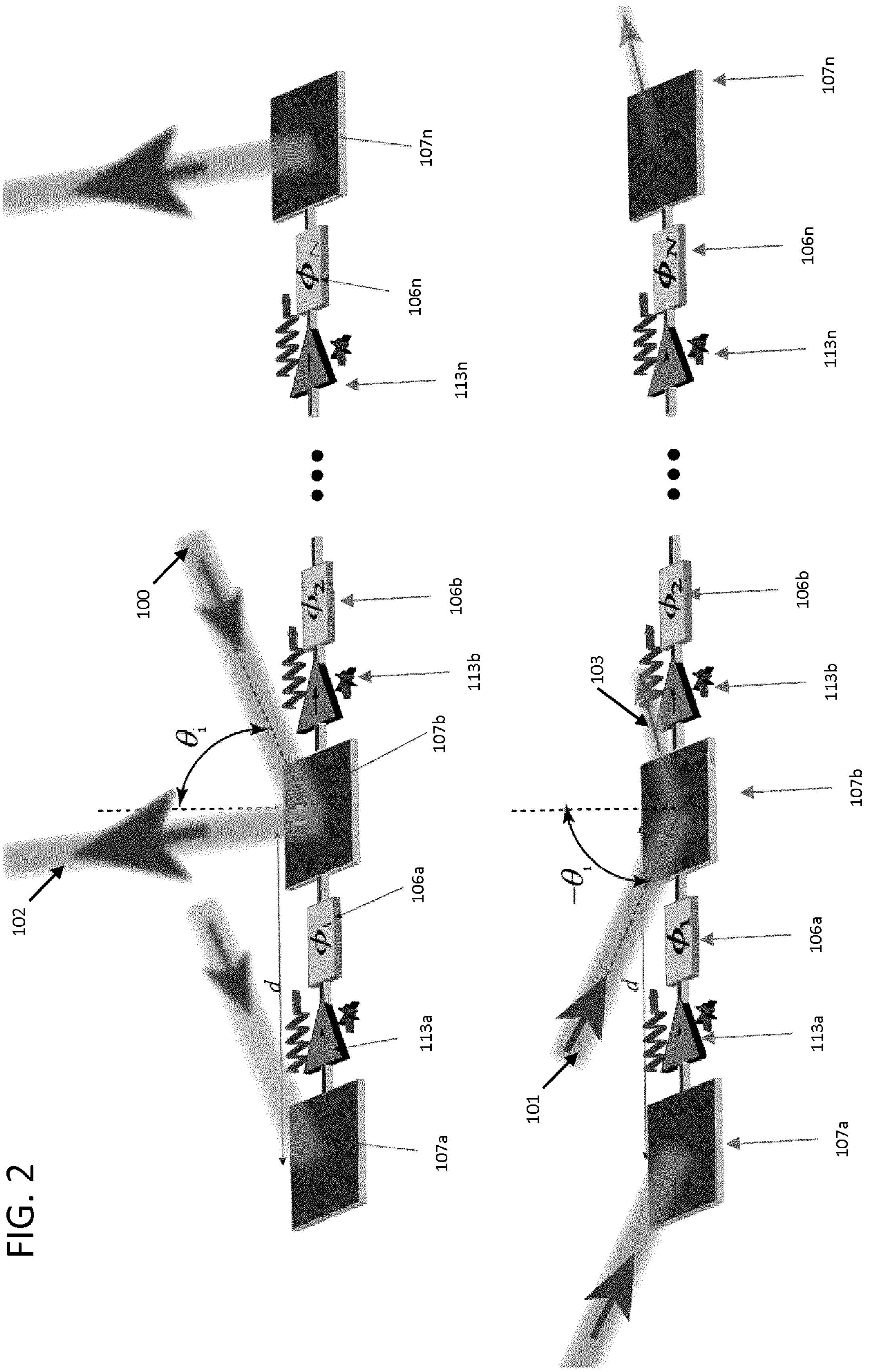
FIG. 2 provides a schematic representation of a chain of interconnected reflective nonreciprocal phase shift unit-cells and their operation under forward and backward incident electromagnetic fields.

FIG. 2 depicts a schematic of chain of interconnected unit-cells. Each unit-cell is composed of a patch antenna element 107, and a nonreciprocal phase shifter 113. The nonreciprocal phase shifters 113 can be either one-way or two-way. A one-way nonreciprocal phase shifter is constituted of a unilateral device, e.g. a transistor-based amplifier, incorporated with a fixed phase shifter 106. The patch antenna elements 107 can be double-fed microstrip patch antennas to allow flow of the transmission of power in the desired direction inside the metasurface. However, the first patch antenna elements 107*a* and last patch antenna elements 107*n* can be single-fed patches. The chain of the interconnected patches 107 and nonreciprocal phase shifters 113 behave differently with the incident waves from the right side 100 and 103, than the left side 101 and 102.

Figure 3:
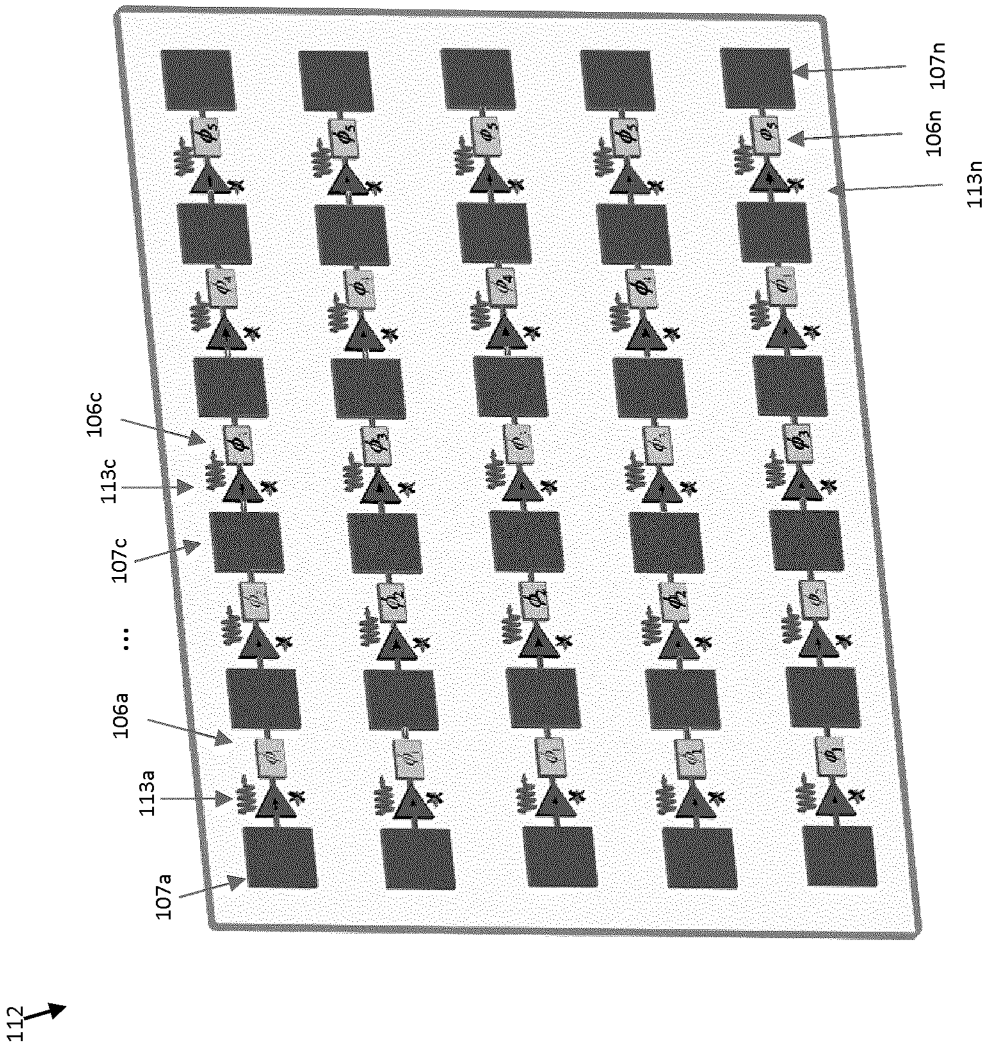
FIG. 3 provides a view of the metasurface system formed by nonreciprocal phase shift radiating unit-cells.

FIG. 3 provides a schematic of the reflective beam-steering metasurface 112. The metasurface is formed by a set of chains (a, b, c, . . . n) of patches 107 interconnected through gradient nonreciprocal phase shifters 113, 106.

The proposed concept and nonreciprocity technique can be utilized at different frequency bands ranging from acoustics and microwaves to terahertz and optics. For instance, one may fabricate a similar metasurface at millimeter waves and terahertz frequencies by adjusting the dimensions of the patch antenna elements and using transistor-based nonreciprocal phase shifters. In one embodiment, patch antenna elements for millimeter waves can be smaller, and unilateral power amplification. Millimeter waves can be useful for optics and optical applications.

To increase the bandwidth, it is possible to use other microstrip patch antennas such as Vivaldi Antennas. This can be translated to terahertz frequency (10^12 Hz) and used for high frequency such as 6G, 7G, 8G, etc.

The size of the array can be changed as needed. For instance, a larger array could be used to increase the angular selectivity. Typically at least two unit cells can be required.

Figure 4:
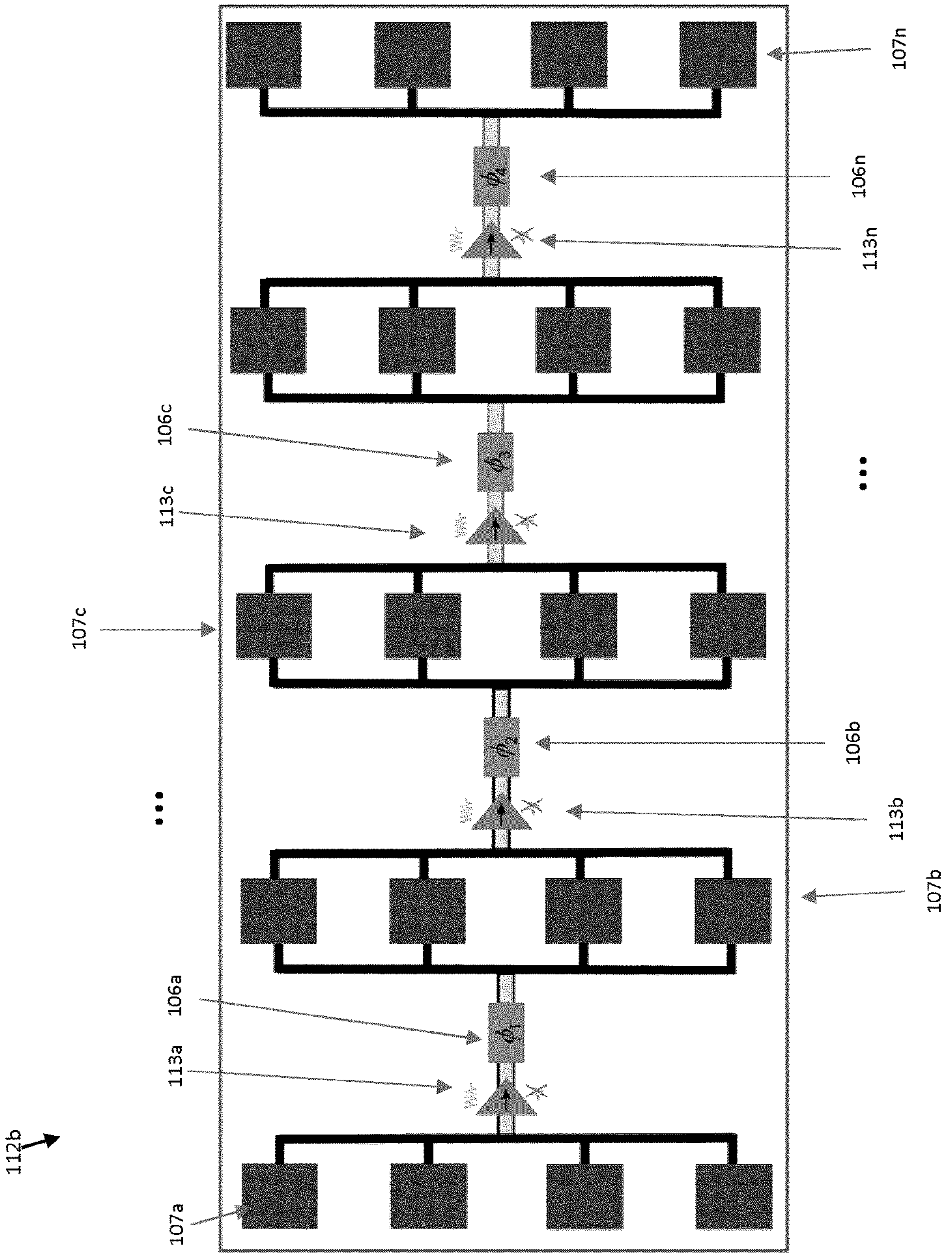
FIG. 4 provides an energy-harvesting version of the metasurface shown in FIG. 3, where fewer unilateral transistors are used.

FIG. 4 provides a schematic view of an energy-harvesting and less-costly version of the reflective metasurface 112*b*. In this embodiment, metasurface 112*b* comprises a smaller number or nonreciprocal phase shifters 106, 113 therefore requiring lower power. In this embodiment, only one set of gradient nonreciprocal phase shifters used per column of patches 107. This embodiment may be implemented in a parallel or series circuit architecture.

Figure 5:
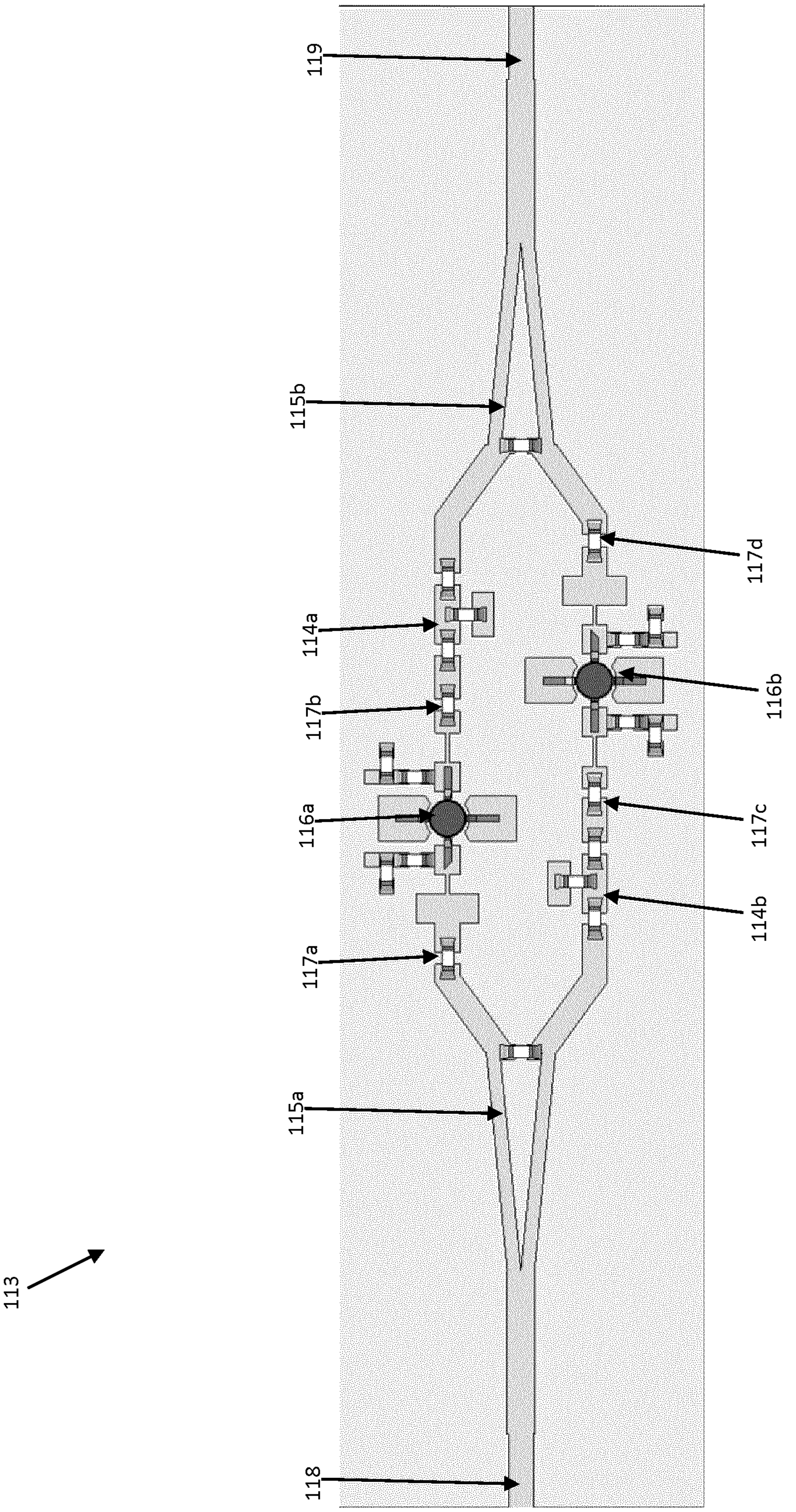
FIG. 5 provides a circuit of the nonreciprocal phase shift unit-cells that can be used for further improvements of the metasurface operation for advanced nonreciprocal beam-steering.

FIG. 5 depicts the structure of a two-way nonreciprocal phase shifter 113. The nonreciprocal phase shifter is formed by two power dividers 115*a*, 115*b*, two unilateral transistor-based amplifiers 116*a* and 116*b*, two fixed phase shifters 114*a* and 114*b*, and four decoupling capacitors 104, 105, 106 and 107. The top and bottom phase shifters provide different phase shifts. The top and bottom amplifiers may provide equal amplification and isolation, in the forward and backward directions, respectively. The signal entering the structure from the left side 118 goes through the upper arm, experiences amplification by the top amplifier and then passes through the top phase shifter. However, the signal entering the structure from the right side 119 goes through the lower arm, experiences amplification by the bottom amplifier and then passes through the bottom phase shifter.

Figure 6:
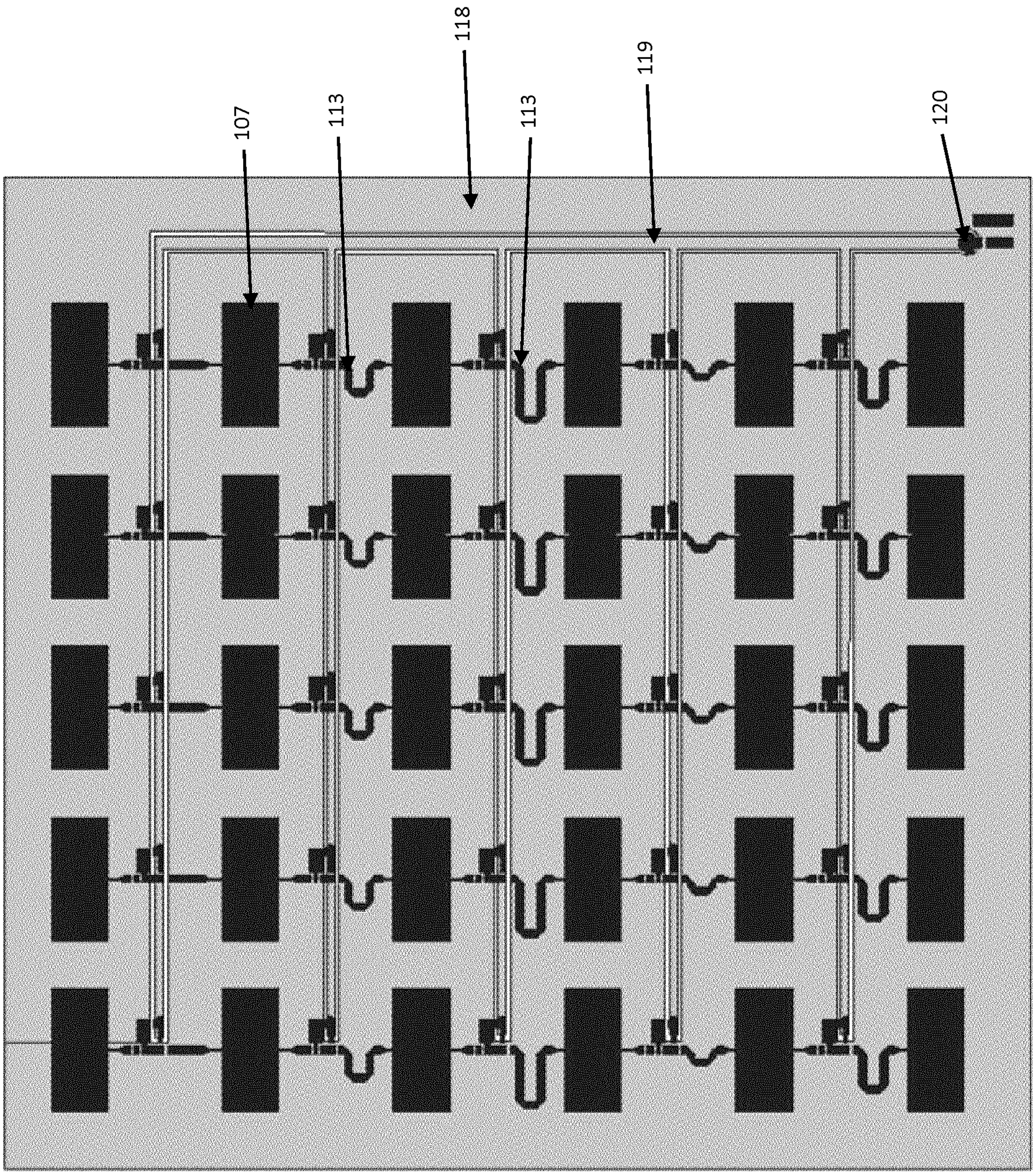
FIG. 6 provides a schematic of the two layers of the fabricated metasurfaces.

FIG. 6 shows the layout of the fabricated reflective beam-steering metasurface. The top layer incudes a set of chains of patches 107 interconnected through one-way transistor-based gradient nonreciprocal phase shifters 113. The bottom conductor layer includes two metals, the first metal 118 acts as the background grounding of the patch antennas 107, and the second metal 119 provides the DC bias of the transistors 118. The DC bias of transistors are supplied to the bottom-right side of the top layer 120, transferred to the bottom layer through a via hole, and then supplied to each transistor through a via hole. In some embodiments, the two metals are not connected.

Figure 7:
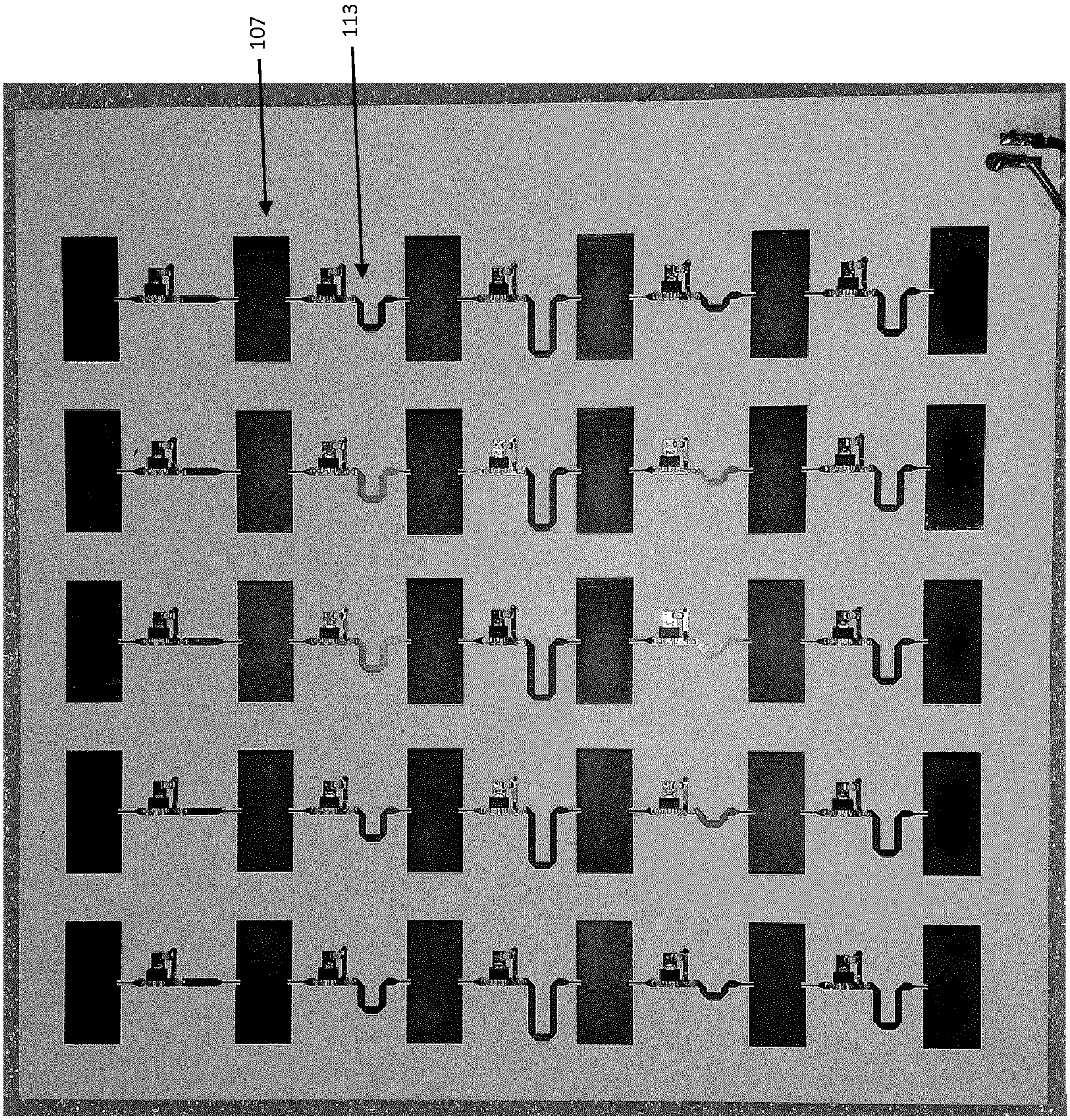
FIG. 7 provides a photograph of the fabricated metasurface.

FIG. 7 provides a photo of the fabricated reflective metasurface. In this embodiment. The metasurface is formed by 30 patch antenna elements 107, (i.e., 20 double-fed and 10 single-fed patch antenna elements), and 25 nonreciprocal phase shifters 113. Each nonreciprocal phase shifter 113 includes a reciprocal transmission-line based phase shifter, a Gali-2+ transistor-based amplifier, two decoupling capacitors, an inductor and a by-pass capacitor.

In an embodiment, a total number of 25 Gali-2+ amplifiers, 25 inductors of $L_{chk}$=15 nH, 25 by-pass capacitors of 100 pF, and 50 decoupling capacitances of $C_{cpl}$=3 pF are used. The metasurface is fabricated as a two-layer circuit, i.e., two conductor layers and one dielectric layers, made of Rogers RO4350 with 30 mils height. Each unit cell comprises one amplifier per unit cell, 1 inductor, 1, by-pass capacitor, and 2 decoupling capacitors. Any thickness layers may be used.

Other Amplifiers may be used. For example, high frequency applications may wish to use alternative amplifiers.

Figure 8:
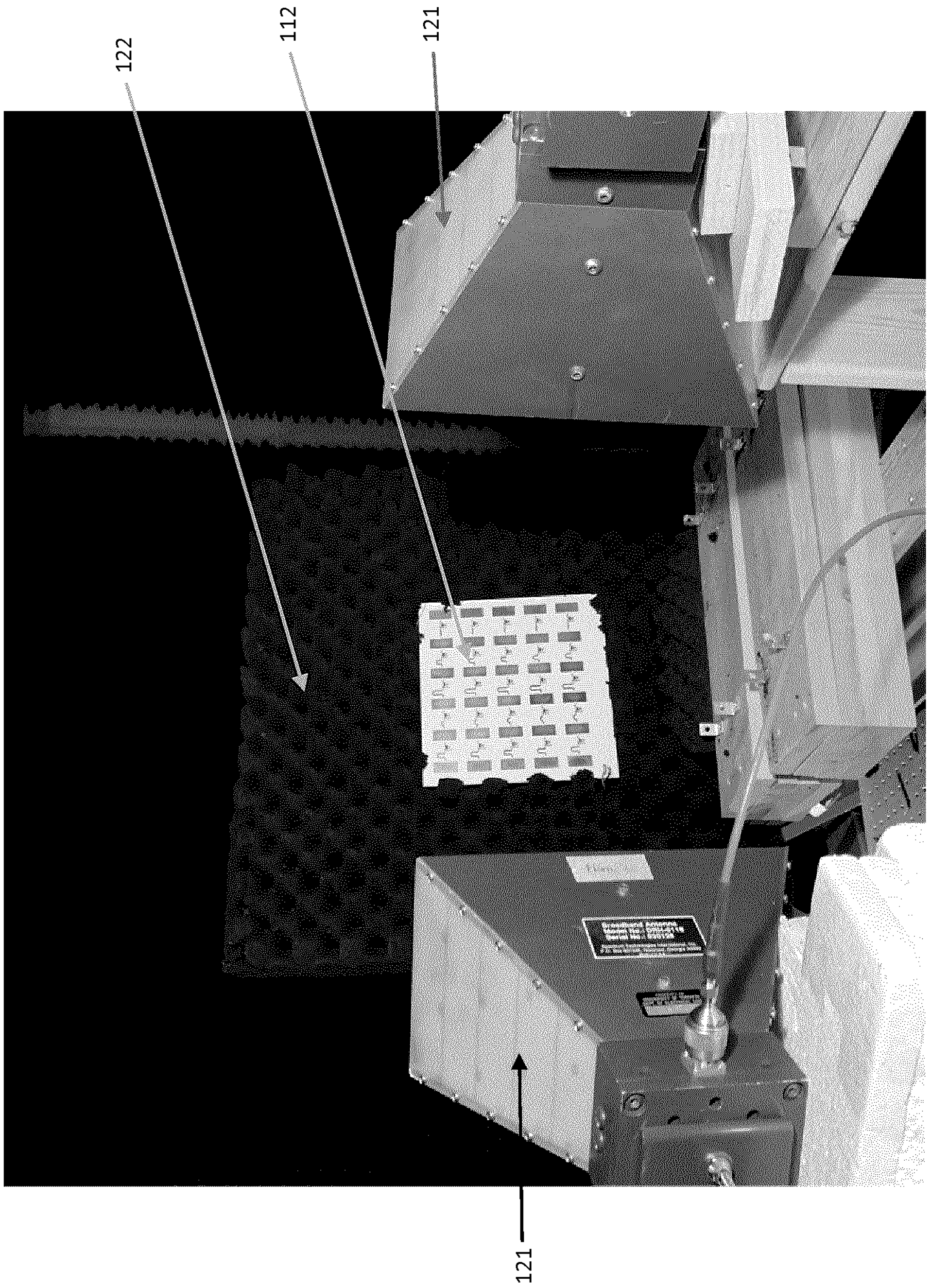
FIG. 8 provides a schematic representation of an experimental set-up of the nonreciprocal radiation beam reflective metasurface.

FIG. 8 provides a schematic diagram showing experimental demonstration of nonreciprocal radiation beam reflective metasurface. The measurement set-up consists of the fabricated reflective metasurface 112, an absorber 122 for holding the metasurface 112, a vector network analyzer, a DC power supply and two horn antennas 121.

Figure 9A:
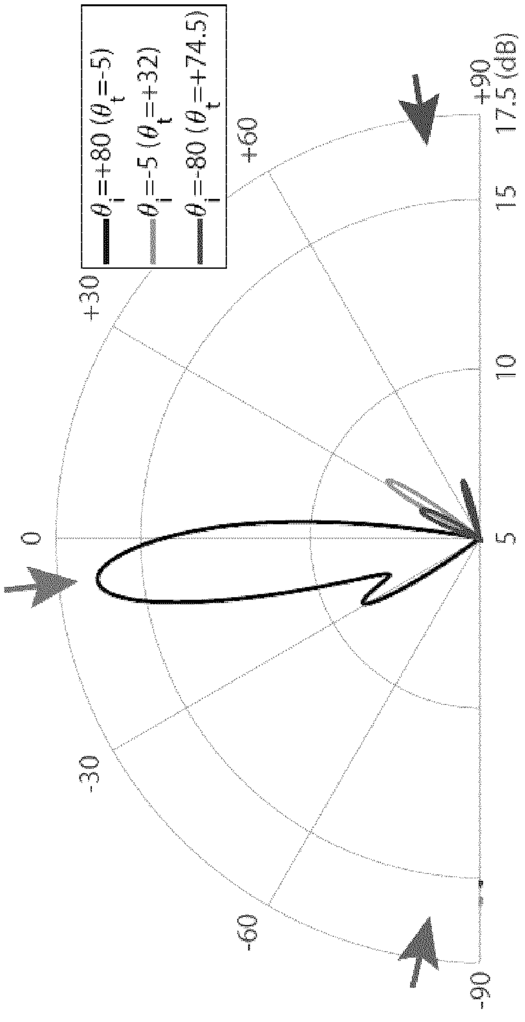
FIG. 9*a* provides the experimental results demonstrating the nonreciprocal full-duplex beam steering functionality for wave incidence from the angle of incidence of eighty degree.

FIG. 9*a* provides the experimental results demonstrating the nonreciprocal full-duplex beam steering functionality for wave incidence from the angle of incidence of eighty degree. For the forward problem, where the incident wave impinges to the metasurface from the right side, i.e., upon the angle of incidence of +80 degree, the wave is being amplified, about 16.5 dB, by the metasurface instantly and is reflected to the desired angle of reflection of −5 degree. However, For the backward problem, where the incident wave impinges to the metasurface from the left side, i.e., upon the angles of incidence of −5 and −80 degree, the wave is not amplified significantly.

Figure 9B:
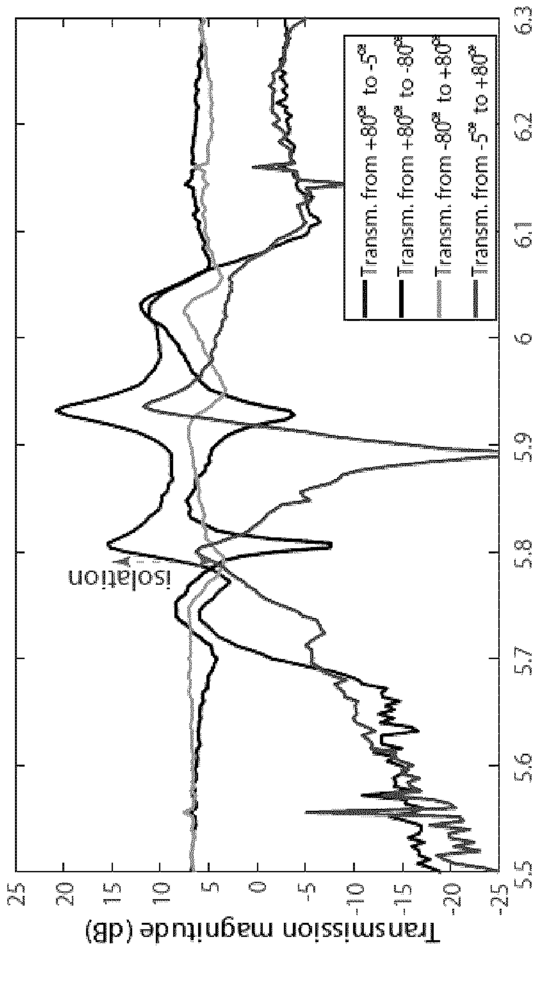
FIG. 9*b* provides the experimental results demonstrating the frequency response of the nonreciprocal full-duplex beam steering functionality for wave incidence from the angle of incidence of eighty degree.

FIG. 9*b* provides the experimental results demonstrating the frequency response of the nonreciprocal full-duplex beam steering functionality for wave incidence from the angle of incidence of 80 degree. The isolation between the wave reflection at different angles shows that a proper wave amplification and isolation is achieved at the frequency of 5.81 GHz.

Figure 10A:
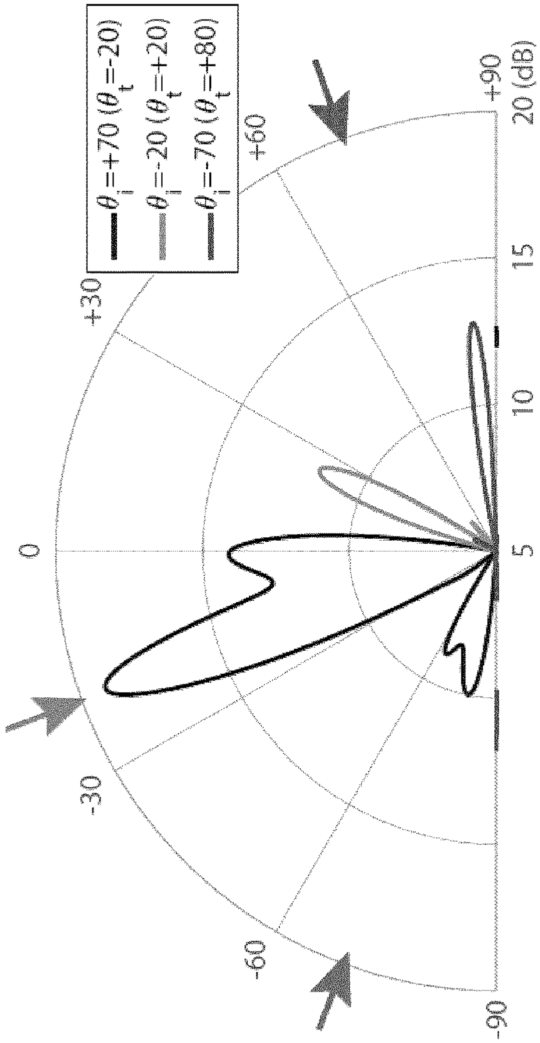
FIG. 10*a* provides the experimental results demonstrating the nonreciprocal full-duplex beam steering functionality for wave incidence from the angle of incidence of seventy degree.

FIG. 10*a* provides the experimental results demonstrating the nonreciprocal full-duplex beam steering functionality for wave incidence from the angle of incidence of seventy degree. For the forward problem, where the incident wave impinges to the metasurface from the right side, i.e., upon the angle of incidence of +70 degree, the wave is being amplified, about 19 dB, by the metasurface instantly and is reflected to the desired angle of reflection of −20 degree. However, For the backward problem, where the incident wave impinges to the metasurface from the left side, i.e., upon the angles of incidence of −20 and −70 degree, the wave is amplified less than 13 dB and under angles of reflections corresponding to the opposite of angles of incidence.

The nonreciprocal full-duplex operation is as follows. The main port for the reception and transmission is placed at −20 degree. As a result, a transmission gain of +12 dB from −20 to +20 is achieved. However, a reception gain of 18.5 dB is achieved from +70 to −20. Hence, the metasurface is capable of simultaneous transmission and reception but at different transmission and reception angels, i.e. with a transmission angel of +20 degree and a reception angel of +70 degree.

Figure 10B:
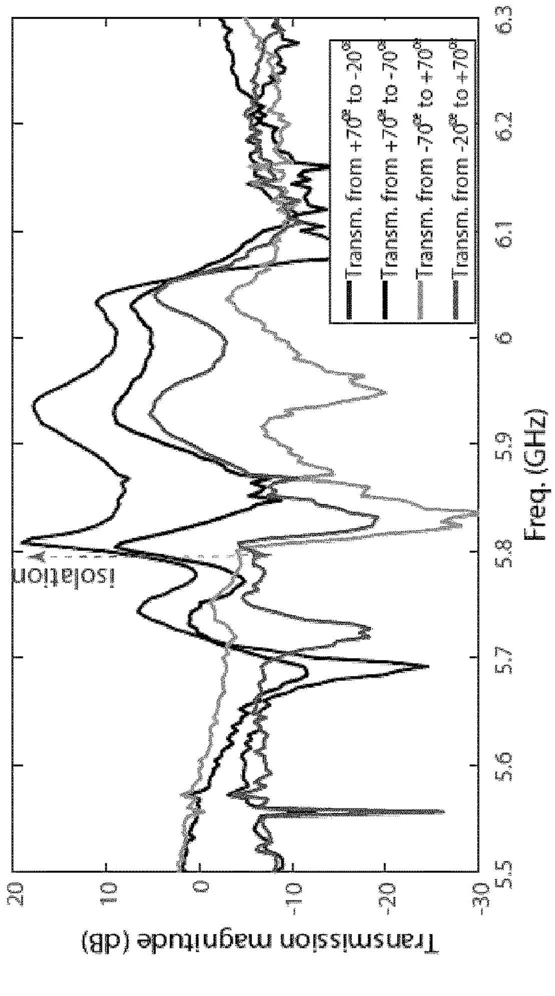
FIG. 10*b* provides the experimental results demonstrating the frequency response of the nonreciprocal full-duplex beam steering functionality for wave incidence from the angle of incidence of seventy degree.

FIG. 10*b* provides the experimental results demonstrating the frequency response of the nonreciprocal full-duplex beam steering functionality for wave incidence from the angle of incidence of 70 degree. The isolation between the wave reflection at different angles shows that a proper wave amplification and isolation is achieved at the frequency of 5.81 GHz.

Figure 11A:
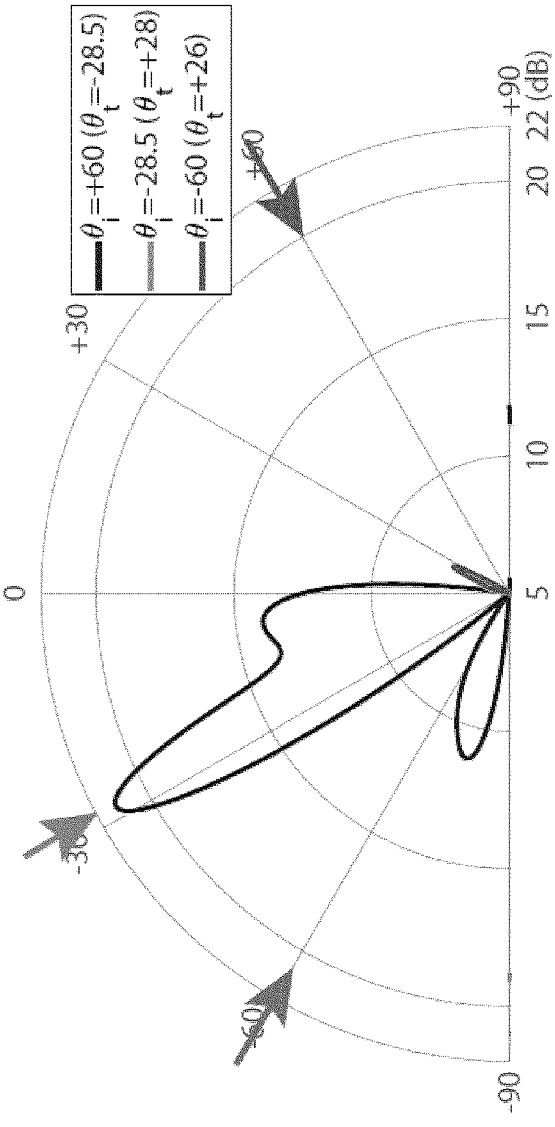
FIG. 11*a* provides the experimental results demonstrating the nonreciprocal full-duplex beam steering functionality for wave incidence from the angle of incidence of sixty degree.

FIG. 11*a* provides the experimental results demonstrating the nonreciprocal full-duplex beam steering functionality for wave incidence from the angle of incidence of 60 degree. For the forward problem, where the incident wave impinges to the metasurface from the right side, i.e., upon the angle of incidence of +60 degree, the wave is being amplified more than 21.2 dB by the metasurface instantly and is reflected to the desired angle of reflection of −28.5 degree. However, For the backward problem, where the incident wave impinges to the metasurface from the left side, i.e., upon the angle of incidence of −28.5 and −60 degree, the wave is not amplified significantly.

Nonreciprocal operation of the metasurface is not only on different wave amplification for forward and backward wave incidences, but also on the beam-steering. The nonreciprocal beam-steering operation of the metasurfaces is as follows. For the forward problem, corresponding to the angle of incidence of +60 degree, the ordinary reflection reads −60 degree, but the wave is steered toward −28.5 degree according to the phase gradient profile of the metasurface. However, for the backward wave incidence, corresponding to the angle of incidence of −28.5 degree, the wave is reflected under the ordinary angle of reflection, i.e., +28 degree. This is due to the fact that the nonreciprocal phase gradient profile of the metasurface mainly affects the forward waves coming from the right side.

Figure 11B:
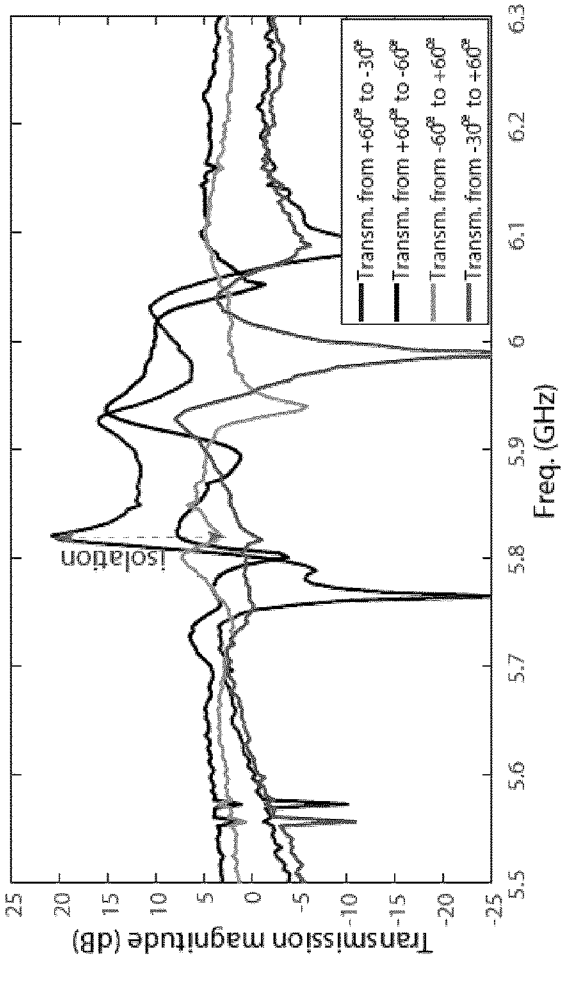
FIG. 11*b* provides the experimental results demonstrating the frequency response of the nonreciprocal full-duplex beam steering functionality for wave incidence from the angle of incidence of sixty degree.

FIG. 11*b* provides the experimental results demonstrating the frequency response of the nonreciprocal full-duplex beam steering functionality for wave incidence from the angle of incidence of 60 degree. The isolation between the wave reflection at different angles shows that a proper wave amplification and isolation is achieved at the frequency of 5.81 GHz.

Figure 12A:
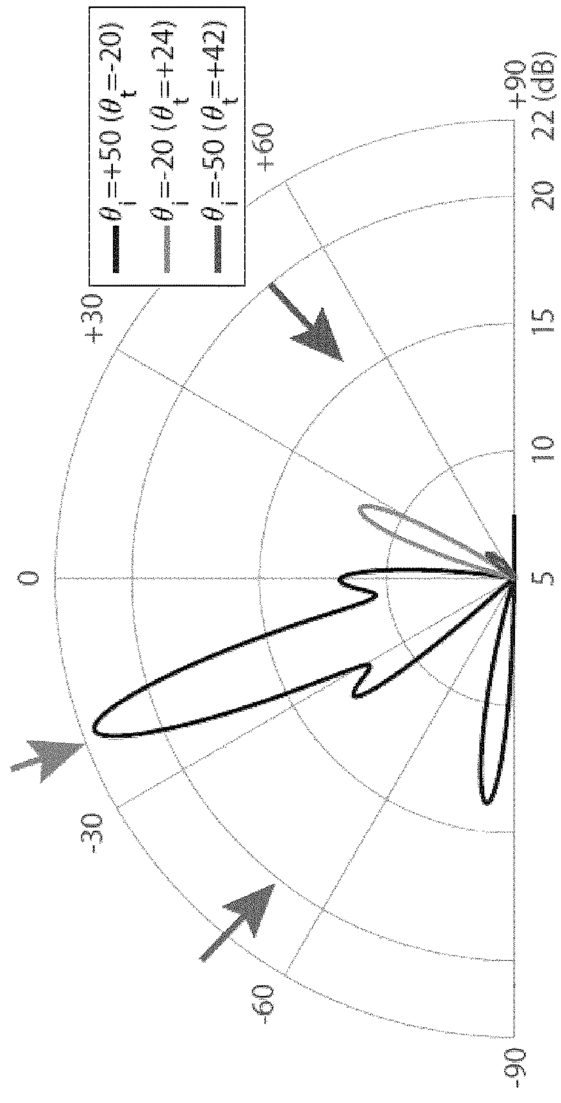
FIG. 12*a* provides the experimental results demonstrating the nonreciprocal full-duplex beam steering functionality for wave incidence from the angle of incidence of fifty degree.

FIG. 12*a* provides the experimental results demonstrating the nonreciprocal full-duplex beam steering functionality for wave incidence from the angle of incidence of 50 degree. For the forward problem, where the incident wave impinges to the metasurface from the right side, i.e., upon the angle of incidence of +50 degree, the wave is being amplified, more than 21.7 dB, by the metasurface instantly and is reflected to the desired angle of reflection of −20 degree. However, For the backward problem, where the incident wave impinges to the metasurface from the left side, i.e., upon the angle of incidence of −20 and −50 degree, the waves are reflected approximately under ordinary angles of reflection and with much less power amplification.

The nonreciprocal full-duplex operation is as follows. The main port for the reception and transmission is placed at −20 degree. As a result, a transmission gain of +12 dB from −20 to +24 is achieved. However, a reception gain of 21.6 dB is achieved from +50 to −20. Hence, the metasurface is capable of simultaneous transmission and reception but at different transmission and reception angels, i.e. with a transmission angel of +24 degree and a reception angels of +50 degree.

Figure 12B:
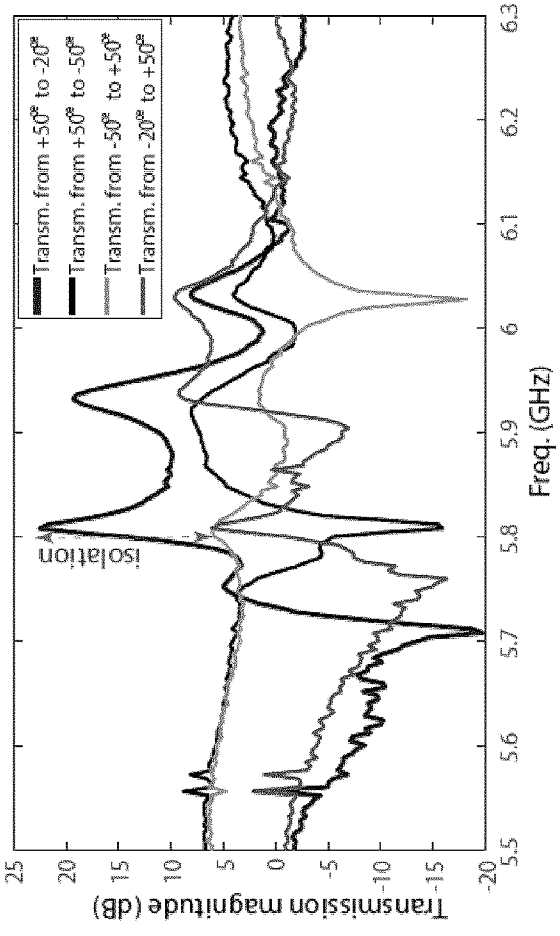
FIG. 12*b* provides the experimental results demonstrating the frequency response of the nonreciprocal full-duplex beam steering functionality for wave incidence from the angle of incidence of fifty degree.

FIG. 12*b* provides the experimental results demonstrating the frequency response of the nonreciprocal full-duplex beam steering functionality for wave incidence from the angle of incidence of 50 degree. The isolation between the wave reflection at different angles shows that more than 21.7 dB wave amplification and isolation is achieved at the frequency of 5.81 GHz.

Figure 13A:
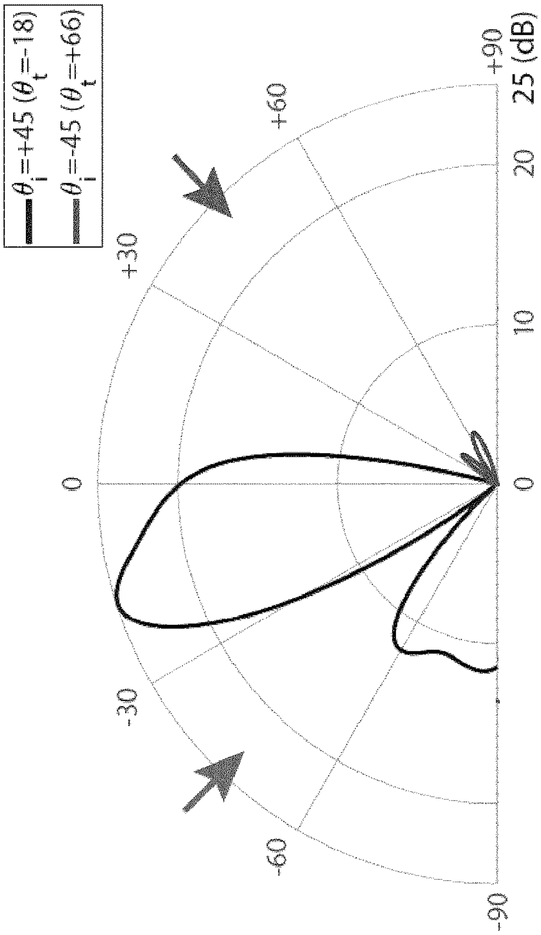
FIG. 13*a* provides the experimental results demonstrating the nonreciprocal full-duplex beam steering functionality for wave incidence from the angle of incidence of forty-five degree.

FIG. 13*a* provides the experimental results demonstrating the nonreciprocal full-duplex beam steering functionality for wave incidence from the angle of incidence of 45 degree. For the forward problem, where the incident wave impinges to the metasurface from the right side, i.e., upon the angle of incidence of +45 degree, the wave is being amplified, more than 25 dB, by the metasurface instantly and is reflected to the desired angle of reflection of −18 degree. However, For the backward problem, where the incident wave impinges to the metasurface from the left side, i.e., under the angle of incidence of −45 degree, the wave is not amplified significantly and is not beam-steered.

Figure 13B:
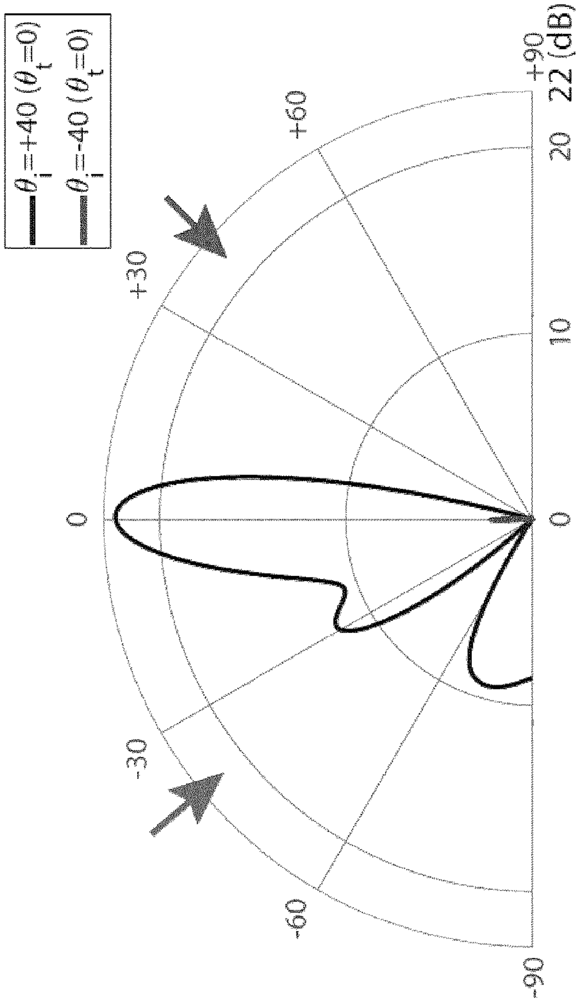
FIG. 13*b* provides the experimental results demonstrating the nonreciprocal full-duplex beam steering functionality for wave incidence from the angle of incidence of forty degree.

FIG. 13*b* provides the experimental results demonstrating the nonreciprocal full-duplex beam steering functionality for wave incidence from the angle of incidence of 40 degree. For the forward problem, where the incident wave impinges to the metasurface from the right side, i.e., upon the angle of incidence of +40 degree, the wave is being amplified, about 21.6 dB, by the metasurface instantly and is reflected to the desired angle of reflection of zero degree. However, For the backward problem, where the incident wave impinges to the metasurface from the left side, i.e., under the angle of incidence of −40 degree, the wave is not amplified significantly.

Figure 14A:
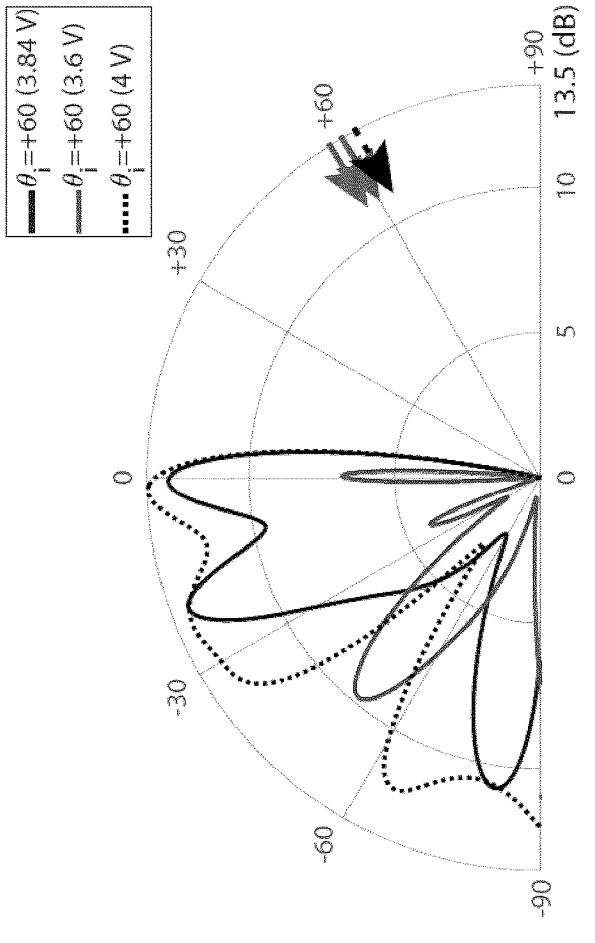
FIG. 14*a* provides the experimental results demonstrating the beam steering functionality through changing the phase shift of nonreciprocal phase shifters for wave incidence from the angle of incidence of sixty degree.

FIG. 14*a* provides the experimental results demonstrating the beam steering functionality through changing the phase shift of nonreciprocal phase shifters, by the DC bias, for wave incidence from the angle of incidence of +60 degree at 5.8 GHz. For the forward problem, where the incident wave impinges to the metasurface from the right side, i.e., upon the angle of incidence of +60 degree, the wave is being amplified more than 10 dB, by the metasurface instantly and is reflected to different desired angles of reflection for the DC bias of 3.6V, 3.84V and 4V.

Figure 14B:
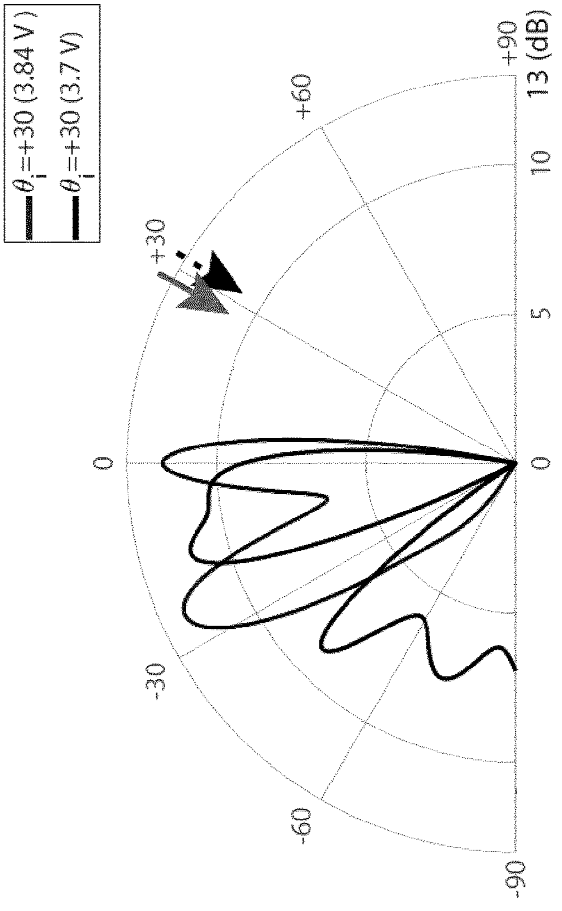
FIG. 14*b* provides the experimental results demonstrating the beam steering functionality through changing the phase shift of nonreciprocal phase shifters for wave incidence from the angle of incidence of thirty degree.

FIG. 14*b* provides the experimental results demonstrating the beam steering functionality through changing the phase shift of nonreciprocal phase shifters for wave incidence from the angle of incidence of +30 degree at the frequency 5.8 GHz. For the forward problem, where the incident wave impinges to the metasurface from the right side, i.e., upon the angle of incidence of +60 degree, the wave is being amplified more than 10 dB, by the metasurface instantly and is reflected to different desired angles of reflection for the DC bias of 3.7V and 3.84V.

Figure 15A:
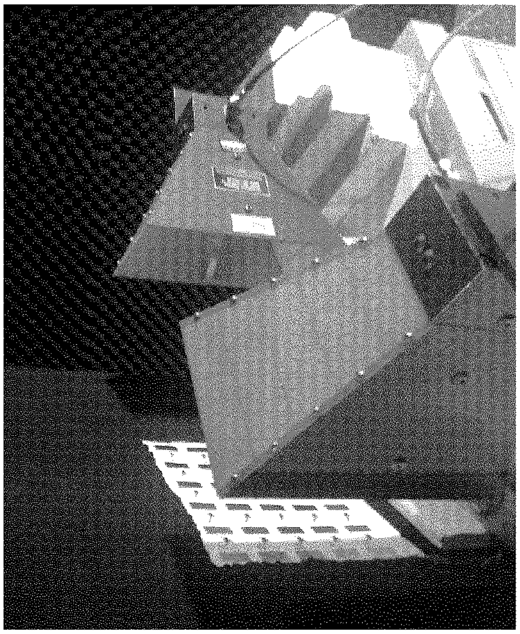
FIG. 15*a* provides a schematic representation of near-field experimental set-up of the nonreciprocal radiation beam reflective metasurface.

FIG. 15*a* provides a schematic representation of near-field experimental set-up of the nonreciprocal radiation beam reflective metasurface. In this experiment, the two source horn antennas are placed inside the near-field zone of the metasurface and very close to the metasurface.

Figure 15B:
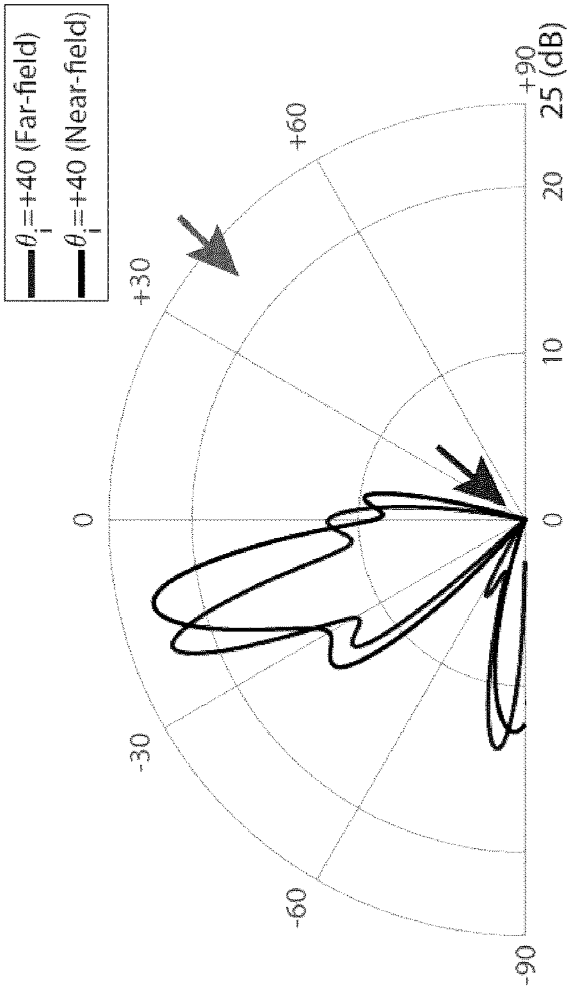
FIG. 15*b* provides the experimental results demonstrating the near-field performance of the metasurface for wave incidence from the angle of incidence of forty degree.

FIG. 15*b* provides the experimental results demonstrating the near-field performance of the metasurface for wave incidence from the angle of incidence of +40 degree. This figure shows that the metasurface provides very close results for both far-field and near-field experiments. This shows great performance of the metasurface in the near-field.

The reflective metasurface provides the opportunity to realize full-duplex reflection beam-steering accompanied by wave amplification. A mechanism is proposed to achieve nonreciprocal beam operation in the reflection state, such that the structure can be used as a radome for antennas or can be installed on a wall. The incident and transmitted waves share the same frequency. The nonreciprocal phase and magnitude transitions in unit-cells are used to realize a radiating nonreciprocal phase shifter, where the structure is immune of undesired frequency harmonics.

It should be noted that there is no inherent limit to the bandwidth enhancement of the proposed metasurface. The frequency bandwidth of the proposed unit-cells may be enhanced by using engineering approaches for the bandwidth enhancement of microstrip patch elements and non-reciprocal phase shifters.

Table 1 provides a summary of one embodiment of the disclosed nonreciprocal-beam steerable reflective metasurface performance. Other ranges of values of operation frequency can be used between 5 GHz to 8 GHz. Higher and lower frequency values can be used as needed.

TABLE 1

| | | | | | | |
|---|---|---|---|---|---|---|
| Operation frequency | | | 5.81 GHZ | | | |
| DC bias | | | 3.84 V | | | |
| Forward incidence | +40° | +45° | +50° | +60° | +70° | +80° |
| Forward reflection | 0° | −18° | −20° | −28.5° | −20° | −5° |
| Backward incidence | −40° | −45° | −50° | −60° | −70° | −80° |
| Backward reflection | 0° | +66° | +42° | +26° | +80° | +74.5° |
| Isolation | >19 dB | >22 dB | >15 dB | >21 dB | >6 dB | >10 dB |
| Forward amplification | >21.5 dB | >25 dB | >21.5 dB | >21 dB | >19 dB | >16 dB |

Different Angles of Reflection, Different Beam Shapes, Amplification, (Programmable, Controllable)

As can be appreciated, a person skilled in the art could easily adapt the technology without inventive step to use higher and lower frequency values, particularly as telecommunication technology evolves to use different frequencies.

Although embodiments of the invention have been described with reference to certain specific embodiments, various modifications thereof may be employed without departing from the spirit and scope of the invention.

The invention claimed is:

1. A metasurface for reflective beam steering comprising:

a dielectric layer sandwiched between two conductor layers;

at least one unit-cell electrically embedded in the two conductor layers;

each of the at least one unit-cell comprising at least one antenna element and at least one non-reciprocal phase shifter;

wherein when an incident electromagnetic wave having a frequency impinges the metasurface, the metasurface amplifies the incident electromagnetic wave and radiates an amplified incident electromagnetic wave having an identical frequency to the frequency of the incident electromagnetic wave, as a reflected wave, to a desired direction.

2. The metasurface of claim 1, wherein the at least one antenna element comprises at least one of a patch antenna element, a microstrip patch radiator, and a patch.

3. The metasurface of claim 1, wherein a DC biasing circuit is embedded inside a bottom conductor layer of the two conductor layers.

4. The metasurface of claim 1, wherein the non-reciprocal phase shifter tunes at least one property of the reflected wave through a DC bias generated by a DC biasing circuit.

5. The metasurface of claim 4, wherein the at least one property includes an angle of reflection of the reflected wave.

6. The metasurface of claim 5, wherein the at least one property includes an amplitude of the reflected wave.

7. The metasurface of claim 6, wherein a surrounding circuit comprises at least one reciprocal phase shifter, at least one transistor-based amplifier, at least one choke inductor, at least two decoupling capacitors included in an RF circuit, and at least one by-pass capacitor.

8. The metasurface of claim 7, wherein at least one unit-cell includes two or more unit-cells, at least one choke inductor prevents leakage of the incident electromagnetic wave to the DC biasing circuit, and at least one decoupling capacitor of one unit-cell of the two or more unit-cells prevents leakage of the DC bias to the RF circuit of a next unit-cell of the two or more unit-cells.

9. A metasurface system for reflective beam steering comprising:

a dielectric layer interposed between two conductor layers;

an array of unit-cells embedded in the two conductor layers;

each unit-cell of the array comprising at least one non-reciprocal phase shifter and at least one antenna element, the dielectric layer and the array combining to create a metasurface;

wherein when an incident electromagnetic wave having a frequency impinges the metasurface, the metasurface amplifies the incident electromagnetic wave and radiates an amplified incident electromagnetic wave having an identical frequency to the frequency of the incident electromagnetic wave, as a reflected wave, to a desired direction.

10. The metasurface system of claim 9, wherein the at least one antenna element comprises at least one of a patch antenna element, a microstrip patch radiator, and a patch.

11. The metasurface system of claim 9, wherein a DC biasing circuit is embedded inside a bottom conductor layer of the two conductor layers.

12. The metasurface system of claim 9, wherein the non-reciprocal phase shifter tunes at least one property of the reflected wave through a DC bias generated by a DC biasing circuit.

13. The metasurface system of claim 12, wherein the at least one property includes an angle of reflection of the reflected wave.

14. The metasurface system of claim 13, wherein the at least one property includes an amplitude of the reflected wave.

15. The metasurface system of claim 14, wherein a surrounding circuit comprises at least one reciprocal phase shifter, at least one transistor-based amplifier, at least one choke inductor, at least one by-pass capacitor, and at least two decoupling capacitors included in an RF circuit.

16. The metasurface system of claim 15, wherein the at least one choke inductor and at least one of the at least two decoupling capacitors separate the DC biasing circuit from the RF circuit of the metasurface.

* * * * *